United States Patent [19]

Barlow et al.

[11] Patent Number: 5,018,818
[45] Date of Patent: May 28, 1991

[54] FIELD INSTALLABLE FIBER OPTIC CONNECTOR

[75] Inventors: Robert W. Barlow, Canton, Pa.;
Robert W. Boucher, Valrico, Fla.;
Thomas M. Lynch, Williamsport, Pa.

[73] Assignee: GTE Products Corporation, Stamford, Conn.

[21] Appl. No.: 535,635

[22] Filed: Jun. 11, 1990

[51] Int. Cl.⁵ .............................................. G02B 6/38
[52] U.S. Cl. ................................. 350/96.2; 350/96.21
[58] Field of Search ........................... 350/96.2, 96.21

[56] References Cited

U.S. PATENT DOCUMENTS 4,743,084  5/1988  Manning ........................ 350/96.21
4,930,859  6/1990  Hoffman, III .................. 350/96.21

Primary Examiner—John D. Lee
Assistant Examiner—Stephen W. Barns
Attorney, Agent, or Firm—William H. McNeill

[57] ABSTRACT

A connector employs a glass sleeve having a ceramic ferrule fixed in one end and containing an optical fiber having its presentation end factory ground. The opposite end of the glass sleeve is formed to receive a fiber during a field installation. The middle portion of the sleeve contains an elastomeric pair which receives the ends of the fibers.

2 Claims, 1 Drawing Sheet

FIELD INSTALLABLE FIBER OPTIC CONNECTOR

TECHNICAL FIELD

This invention relates to fiber optic connectors and more particularly to fiber optic connectors that are easily field installable.

BACKGROUND ART

Fiber optic connectors are known commodities whose use is increasing dramatically. Such connectors usually employ an assembly which contains a ceramic ferrule at one end, this ferrule containing a centrally located optical fiber. The mating end of the ferrule and its associated fiber are usually factory polished so that a satisfactory butt joint may be consummated with an adjoining connector. The connector has an extended length of optical fiber projecting from its opposite end and, to utilize the connector, another optical fiber is spliced to the distal end of the fiber.

While this technique poses few problems in a factory or laboratory environment, it would be advantageous to have a connector that would be easily field installable.

SUMMARY OF THE INVENTION

It is, therefore, on object of this invention to provide a simple, field installable connector that utilizes a polished fiber end.

This is accomplished, in one aspect of the invention, by the provision of a field installable connector comprised of a tubular splice sleeve having a first end formed to receive an optical fiber and a second end formed to provide a ceramic ferrule containing a polished fiber section. A middle portion of the sleeve contains a mated pair of elastomeric halves. The ferrule mounted fiber extends about half way into the elastomeric halves. To field mount the connector a fiber has its end stripped and inserted into the sleeve until the fiber end abuts the ferrule fiber which is already in place. The fiber may be cemented or otherwise affixed in position to complete the connector.

BEST MODE FOR CARRYING OUT THE INVENTION

For a better understanding of the present invention, together with other and further objects, advantages and capablities thereof, reference is made to the following disclosure and appended claims taken in conjunction with the above-described drawings.

Figure 4:
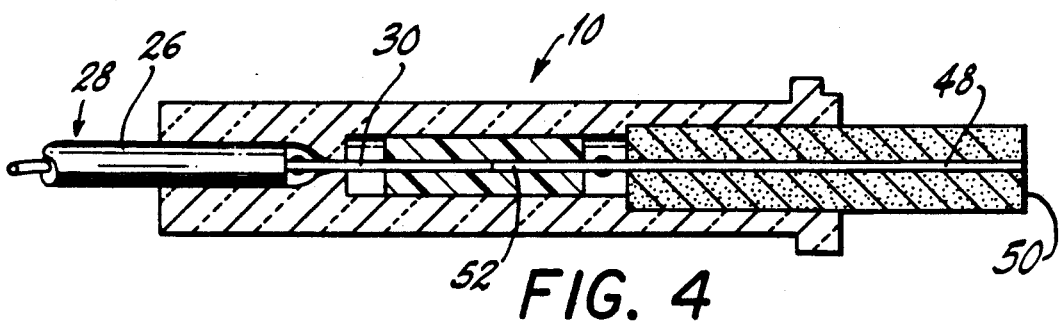
FIG. 4 is a similar view of a completed connection.

Referring now to the drawings with greater particularity, there is shown in FIG. 4 a field installable fiber optic connector comprising an elongated tubular splice sleeve 12 having a longitudinal axis 14 and a first end 16 formed to receive and align an optical fiber. The first end 16 includes a first diametered bore 20 extending a given distance 22 inwardly of sleeve 12 and tapering to a narrower, second diametered bore 24. The first diametered bore 20 is of a size to receive the coated portion 26 of a fiber 28 and the second diametered bore 24 is of a size to receive a stripped fiber 30. A middle portion 32 and a contiguous second end 34 extend sequentially from the first end 16. The middle portion 32 has a third diametered bore 38 which is larger than the first diametered bore 20 and contains a mated pair 40 of elastomeric halves therein. The elastomeric halves can be of the type shown in U.S. Pat. No. 4,257,674. The second end 34 has a fourth diametered bore 42 with a ceramic ferrule 44 mounted therein. The ceramic ferrule 44 is comprised of a cylindrical member having an outside diameter equal to the fourth diametered bore 42 and contains a longitudinal bore 46 to receive an optical fiber section 48. The optical fiber section 48 has one end terminating at the outside surface 50 of ferrule 44 and has its other end 52 projecting inwardly of the sleeve 12 and terminating at the halfway point of mated pair 40 of the elastomeric halves.

Figure 1:
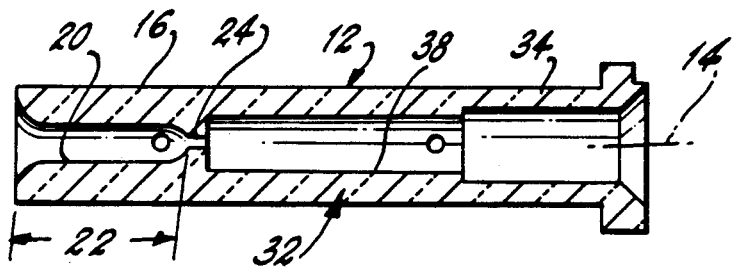
FIG. 1 is a longitudinal sectional view of a splice sleeve.
Figure 2:
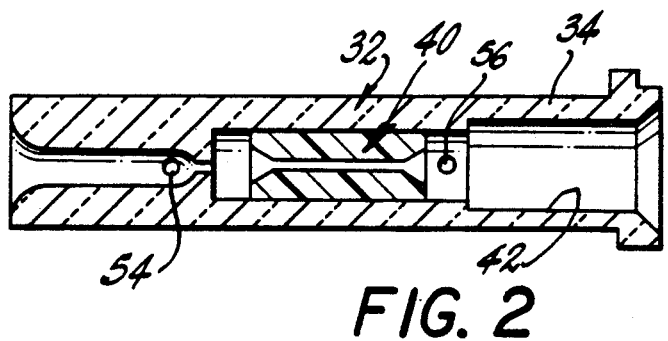
FIG. 2 is a similar view showing the mated pair of elastomers in place.
Figure 3:
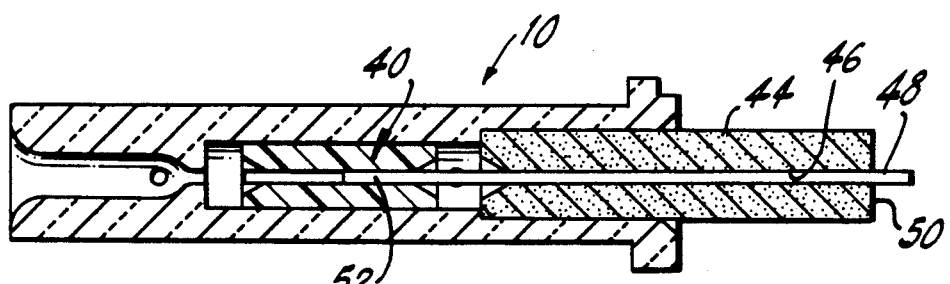
FIG. 3 is a similar view showing the ceramic ferrule in place.

As shown in FIG. 3, the fiber section 48 can initially project beyond the surface 50 and subsequently be ground to the configuration shown in FIG. 4. This is a factory operation and thus can be critically controlled. The connector as shown in FIG. 3, with the projecting fiber ground down, comprises the part which is taken to the field. Mounting means, not shown, which can comprise a rotatable nut positioned abount second end 34, can be provided, as is known in the art.

To aid in cementing the various parts together a first vent hole 54 is provided in the first diametered bore 20 adjacent the second diametered bore 24 and a second vent hole 56 is provided in the third diametered bore 38 between an end of the mated pair 40 of the elastomeric halves and the inner end of ferrule 44.

For field installation it is only necessary for the lineman to strip a cable 28 and insert the stripped end 30 into the first end 16 until the stripped end 30 butts against the internal end of optical fiber section 48 within the mated pair 40 of the elastomeric halves, as shown in FIG. 4. An adhesive, which can be an ultra-violet activated one, can then be applied about the cable 28.

There is thus provide a field installable fiber optic connector which is simple to use and economical to manufacture. Because the fiber end is factory ground, the connection can be made with less attenuation than other field installable connectors.

While there has been shown and described what is at present considered to be the preferred embodiment of the invention, it will be apparent to those skilled in the art that various changes and modifications can be made herein without departing from the scope of the invention as defined by the appended claims.

What is claimed is:

1. A field installable fiber optic connector comprising: an elongated tubular splice sleeve having a longitudinal axis and a first end formed to receive and align an optical fiber, said first end including a first diametered bore extending a given distance inwardly of said sleeve and tapering to a narrower, second diametered bore, said first diametered bore being of a size to receive a coated fiber and said second diametered bore being of a size to receive a stripped fiber; said sleeve having a middle portion and a contiguous second end, said middle portion having a third diametered bore, larger than said first diametered bore and containing a mated pair of elastomeric halves, which when mated form a fiber receiving bore there through, therein; said second end having a fourth diametered bore; a ceramic ferrule mounted in said fourth diametered bore, said ceramic ferrule comprised of a cylindrical member having an outside diameter equal to said fourth diametered bore and containing a longitudinal bore to receive an optical fiber, and an optical fiber therein, said optical fiber having one end terminating at the outside surface of said ferrule and having its other end projecting inwardly of said sleeve and terminating at the halfway point of said elastomeric halves.

2. The connector of claim 1 wherein a first vent hole is provided in said first diametered bore adjacent said second diametered bore and a second vent hole is provided in said third diametered bore between an end of said mated pair of elastomeric halves and the inner end of said ferrule.

* * * * *